Patented June 13, 1939

2,162,014

UNITED STATES PATENT OFFICE 2,162,014

ANTISEPTIC AND PROCESS OF MAKING IT

Russell Hopkinson and Alexander V. Tolstoouhov, New York, N. Y., assignors to Ostro Research Laboratories, Inc., New York, N. Y., a corporation of New Jersey No Drawing. Application November 14, 1935, Serial No. 49,710

17 Claims. (Cl. 167—71)

This invention relates to organic mercury compounds that are strongly bactericidal and yet are thoroughly soluble in water in any dilution up to one per cent. and to the process of producing the same. Unlike previous strongly bactericidal organic compounds of mercury, the compounds of the present invention do not require the addition of an alkali to dissolve them in water. They are easily dissolved in distilled water. This is a great advantage in connection with the storage, distribution and dispensing of the antiseptic.

Heretofore compounds have been produced by causing the direct mercuration of azo dyes containing hydroxyl groups, and compounds have also been produced by coupling diazo solutions with mercurated phenols. However, such compounds were unstable and were not soluble in water to an appreciable extent. Also, attempts to prepare free acids of such compounds having sulfonic acid groups attached to an aryl ring have failed.

By the present invention the free acids of aryl azo compounds having at least one sulfonic acid group attached to an aryl ring and mercury and a hydroxyl group attached to another aryl ring of the compound are produced without splitting the C—Hg linkage or bond between the mercury and a carbon atom of the aryl ring. These compounds possess valuable and unexpected characteristics which distinguish them from their sodium salts and also from all other mercury compounds with which we are familiar, especially with respect to their bactericidal power and solubility in water.

The disadvantage of the previously produced alkali metal or sodium salts of such compounds, contrary to expectations, is that they lack both solubility and bactericidal activity. For example, the sodium salt of 3-chloro-mercuri-4-hydroxy-azobenzene-4$^1$-sulfonic acid, as previously produced is not completely soluble in 2000 parts of water, and in order to form a one per cent. solution of it a sufficient amount of alkali must be added to raise the pH of the solution to 9.5. At such a pH it cannot be used on delicate mucous membranes, and when it is applied to the skin and the alkalinity is neutralized by the acids normally present in the skin, it is precipitated without penetration. This compound fails to kill Staphylococcus aureus in a dilution of 1:2000 on five minutes' contact.

On the other hand, the free acid of this same compound, when prepared by our method as described below, is sufficiently soluble to form readily a one per cent. solution in water, and, contrary to expectations, this solution can be brought by the addition of an alkali such as sodium hydroxide, for example, to any desired pH between 3 and 9 without precipitating the insoluble alkali or sodium salt. Or sodium bicarbonate may be mixed with the powdered free acid of this same compound, and the material dispensed in this form. The resulting mixture is readily soluble in water to form a one per cent. solution, the pH of which may be regulated beforehand by adding the proper amount of sodium bicarbonate. A very convenient powdered mixture can be formed by adding approximately twelve parts by weight of sodium bicarbonate to twenty parts of dry 3-chloro-mercuri-4-hydroxy-azobenzene-4$^1$-sulfonic acid which will form a 1% solution in water having a pH of about 5. It kills Staphylococcus aureus in dilutions of 1:10,000 within five minutes' contact. Being non-irritating, this compound is very useful as an antiseptic and can be applied to the skin in the form of a two percent. tincture, or a one percent. aqueous solution or as a salve. It may be used for irrigation of internal cavities as a 1 to 2000 aqueous solution, without irritation.

This freedom from irritation may possibly be due to the fact that a 1% solution at a pH between 4 and 7 does not react with serum proteins or precipitate them. Prior compounds of mercury possessing the property of killing bacteria at such high dilution also precipitate serum proteins at this pH range.

In carrying out this invention, a diazotized aryl amino sulphonic acid, such as sulfanilic, metanilic, naphthionic, benzidine disulfonic, and 1-amino-naphthalene-3,6-disulfonic acid, is coupled with a mercurated phenol or naphthol by any known method. This may be done, for example, according to the description by Whitmore in the Journal of American Chemical Society, 48, 1013–1016 (1926). We prefer, however, not to cause the coupling to take place in an alkaline solution. In fact, not much, if any, coupling occurs above pH 7, but the most suitable pH for the coupling seems to be at a pH between 3 and 6. Coupling is usually complete in thirty minutes. If the coupling solution is sufficiently concentrated, the alkali salt of the compound crystallizes out and may be separated by filtering from the mother liquor and treated with an acid in a separate step, as described below. If the solution is dilute, of course crystallization will not take place, but the alkali salt can be converted to the soluble free acid by adding acid to the coupling solution to bring to a pH below 1.5, preferably to .8. The conversion from the salt to the free acid is characterized by the formation of a red, flocculent precipitate composed of minute crystals or of amorphous character. After the conversion from the salt to the acid is complete the compounds should not be allowed to remain in contact with strong acid for a long time, especially at high temperature. It is best to filter off immediately, wash with more acid, which should be diluted, followed preferably by alcohol or acetone, before drying. Drying should be carried out preferably at room temperature, and high temperatures should be avoided especially if excess acid was not thoroughly removed from the precipitated product.

Hydrochloric acid has proven to be most satisfactory in converting the salt into its acid as a small volume of it readily produces the low pH that is needed, and on account of its volatility the excess hydrochloric acid is readily removed from the product. Other acids that have been found to be useful in producing this conversion are hydrobromic, sulphuric, phosphoric, perchloric, and trichloracetic. Weaker acids, such as acetic, do not appear to produce the change in any concentration or by a long time of contact.

An analysis of the compound shows only traces of sodium. The kind of acid radical that is attached to the mercury will depend on the nature of the acid used, and the quantity of the acid radical that is attached to the mercury will depend on the concentration and also on the time of contact before filtering. For example, if sufficient hydrochloric acid is added to make a ten percent. concentration, the red precipitate may be filtered off in a few minutes and the product will show the presence of 1 atom of Cl for every molecule of the compound. Treatment with two and one-half percent. of HCl will seldom produce more than 1 atom of Cl for every two molecules of the compound, even after standing several hours. Treatment with one and one-half percent. of HCl produced a soluble red free acid having considerably less bactericidal activity, which analysis showed only one atom of Cl for every three molecules.

The nature of the change that is produced by treating the salt with acid is not completely understood. It does not appear to be a mere removal of alkali or sodium from the compound, as removal of the alkali or sodium from the salt in other ways such as by dialysis, for example, to obtain the acid or an anhydride of it does not produce a water soluble compound with antiseptic properties.

A soluble compound is not produced even when all the alkali or sodium is removed by dialysis, and a sufficient amount of HCl is added to a 1% suspension of the dialyzed material to restore the quantity of Cl that is found in the red material that is produced in accordance with this invention. Dialysis may be brought about by introducing the alkali or sodium salt with distilled water into a collodion sac and surrounding it with distilled water which is changed until dialysis is complete. The remaining material is dried and is free from the alkali and the acid radical.

As in the case of the alkali salt, this product of dialysis may be rendered soluble and bacteriologically active by treatment with strong acid at a pH below 1.5. And, again, as in the case of the alkali salt, the change is characterized by a change in the color and nature of the precipitate, which varies somewhat with the particular compound used, but generally speaking, the product formed is of a red, amorphous character.

The following is given as a specific example of carrying out the process, but it is to be understood that the invention is not restricted to the particular materials or details.

1 mol of diazotized sulfanilic acid in dilute HCl was coupled at about 5° C. with 1 mol of ortho chlor-mercuri phenol which had been dissolved in a dilute aqueous sodium hydroxide solution. The quantity of hydrochloric acid and sodium hydroxide were adjusted so that the coupling solution had a pH between 3 and 5. In a few minutes a fine golden yellow precipitate composed of small flat triangular crystals appeared, giving the solution an opalescent appearance. In half an hour these were filtered off, washed and shaken up in 50 times their weight of water. Sufficient HCl was added to make an 8% concentration and the whole stirred for an hour. A red amorphous precipitate replaced the yellow crystals and was filtered off and dried at 45° C.

Analysis of the product showed:

|  | Cl | S | Hg | Na |
|---|---|---|---|---|
| Theoretical for $C_{12}H_9O_4N_2ClSHg$ | 6.9 | 6.25 | 39. | 0 |
| Found | 6.7 | 6.02 | 39.08 | 0.21 |

Similar compounds were obtained in the same manner by coupling 1 mol of various diazotized amino sulphonic acids with 1 mol of various mercurated phenols and naphthols as shown in the following table. In this table, under starting materials, we have shown the mercurated phenols and naphthols in each case as their chloro compounds, merely because the latter recrystallize readily from hot water and are therefore the easiest to obtain in a pure state. In this table the last column shows the greatest dilutions which will kill Staphylococcus aureus in ten minutes' contact, but not in five minutes.

|  | Acid diazotize | Coupled to— | Color of sodium salt | Free acids | | Bactericidal test. Greatest dilution killing *Staph. aureus* on 10-minute contact but not on 5 |
|---|---|---|---|---|---|---|
|  |  |  |  | Color | Color of aqueous solution |  |
| 1 | Sulphanilic | 2-chloro-mercuri-6-methyl-phenol | Dark brown | Black | Cherry red | 1:5000 |
| 2 | ...do... | 2-chloro-mercuri-4-methyl-phenol | Mustard | Light brown | ...do... | 1:5000 |
| 3 | ...do... | 2-chlor-6-chloro-mercuri phenol |  | Purplish black | Dark brown | 1:5000 |
| 4 | ...do... | o-Chloro-mercuri thymol | Brown | Black | Bordeaux red | 1:2000 |
| 5 | ...do... | Alpha chloro-mercuri beta naphthol | Orange | Dark orange | Reddish orange | 1:1000 |
| 6 | ...do... | 3-chloro-mercuri-4-hydroxyazobenzene-4-sulphonic acid | Mustard | Brown | Reddish brown | 1:10,000 |
| 7 | Metanilic | o-Chloro-mercuri phenol | ...do... | Red | Reddish orange | 1:1000 |
| 8 | Naphthionic | ...do... | Red | Black | Brown | 1:10,000 |
| 9 | Benzidine disulphonic | o-Chloro-mercuri phenol | Dark brown | ...do... | Dark brown | 1:5000 |
| 10 | 1-amino naphthalene 3,6 disulphonic | ...do... | ...do... | Purple black | Reddish orange | 1:10,000 |

The water soluble antiseptics that are produced in accordance with this invention as described above by treating with an acid the products resulting from coupling diazotized aryl amino sulphonic acid with mercurated phenol or naphthol may be represented by the general formula

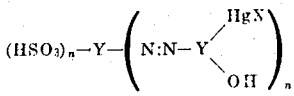

in which X is an acid radical, Y is aryl and n is one or two.

The step of coupling the components shown in numbers 3, 4, 5, 6, 9 and 10 of the preceding table, as well as their resulting products, are new so far as we are aware, whether these are in the form of the alkali metal salt or of the free acid. As explained above, if they are recovered from a solution having a pH above 1.5 in the presence of an alkali metal, they will be obtained as the salt of this alkali metal. If they are recovered from a solution having a pH below 1.5, the product will contain increasing proportions of free acid as the pH of the solution is lowered.

We claim:

1. An antiseptic comprising a water soluble compound of the general formula

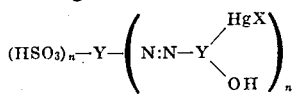

in which X is an acid radical, Y is aryl, and n is one or two.

2. An antiseptic comprising a water soluble compound of the general formula

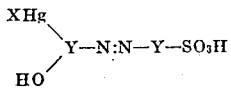

in which X is an acid radical, and Y is aryl.

3. An antiseptic comprising a water soluble compound of the general formula

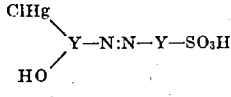

in which Y is aryl.

4. An antiseptic comprising a compound of the general formula

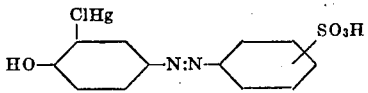

5. An antiseptic comprising 3-chloromercuri-4-hydroxy-azobenzene-4$^1$-sulphonic acid.

6. As an antiseptic material, solution of a compound of the general formula

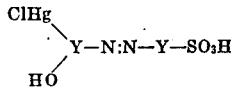

in which Y is aryl, having a pH between about 3 and 9.

7. As an antiseptic material, solution of 3-chloromercuri-4-hydroxy-azobenzene-4$^1$-sulphonic acid having a pH between about 3 and 9.

8. As a new composition of matter a powdered mixture comprising a water soluble compound of the general formula

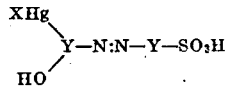

in which X is an acid radical and Y is aryl, and a sufficient amount of an alkali to raise the pH of an aqueous solution of the composition to between 3 and 9.

9. As a new composition of matter a mixture comprising approximately 1.2 gms. of sodium bicarbonate to each 2 gms. of 3-chloro-mercuri-4-hydroxy-azobenzene-4$^1$-sulphonic acid present in the mixture.

10. The process of producing a water-soluble antiseptic compound which comprises treating the alkali metal salt of 3-chloro-mercuri-4-hydroxy-azobenzene-4$^1$ sulphonic acid in an aqueous medium with hydrochloric acid at a pH below 1.4, recovering the free acid of the dye and drying.

11. The process which comprises removing by dialysis the alkali metal and acid radical from a salt of the general formula

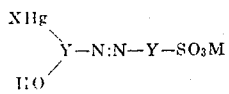

in which X is an acid radical, Y is aryl and M is an alkali metal and treating the dialyzed product with a strong acid at a pH below 1.5.

12. A product having the formula

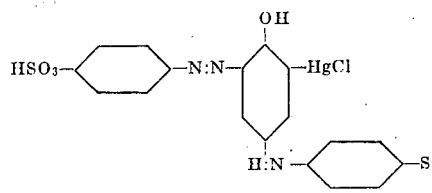

13. A product having the formula

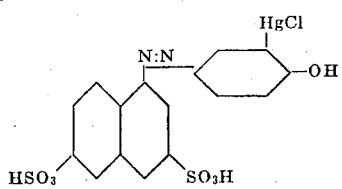

14. A water soluble bacteriacidal material of the following structural formula X—Hg—Y—Z in which X is the negative radical of an acid capable of developing a pH of less than 1.5 in aqueous solution, Y is an aryl group having a hydroxyl substituent and Z is one or two azo aryl sulphonic acid groups.

15. A water soluble bacteriacidal material of the following structural formula X—Hg—Y—Z in which X is the negative radical of an acid selected from the group consisting of hydrochloric, sulphuric, phosphoric, perchloric and trichloracetic, Y is an aryl group having a hydroxyl substituent and Z is one or two azo aryl sulphonic acid groups.

16. The process which comprises coupling a diazotized amino aryl sulphonic compound with an aryl hydroxy compound having a mercury substituent attached on the one hand to the ring and on the other hand to an acid radical, reacting the coupled compound with an acid at a pH or less than 1.5 and combining the negative radical of said acid with said coupled compound in the ratio of at least one radical of said acid to one molecule of said coupled compound, whereby a water soluble bacteriacidal compound is produced.

17. The process of producing a water-soluble antiseptic compound which comprises treating the product resulting from coupling a diazotized amino aryl sulphonic compound and a hydroxy aryl compound having a mercury substituent in the ring, said mercury having an acid radical attached thereto with on acid solution at a pH of less than about 1.5.

RUSSELL HOPKINSON.
ALEXANDER V. TOLSTOOUHOV.